(12) United States Patent
Langerman

(10) Patent No.: US 7,957,987 B2
(45) Date of Patent: Jun. 7, 2011

(54) USING SOFTWARE AGENTS TO SCHEDULE AIRLINE FLIGHTS

(75) Inventor: Josef J. Langerman, Beyerspark (ZA)

(73) Assignee: EDS South Africa (Pty) Ltd., Sunninghill (ZA)

( * ) Notice: Subject to any disclaimer, the term of this patent is extended or adjusted under 35 U.S.C. 154(b) by 870 days.

(21) Appl. No.: 10/835,075

(22) Filed: Apr. 30, 2004

(65) Prior Publication Data

US 2005/0246208 A1 Nov. 3, 2005

(51) Int. Cl.
*G06Q 10/00* (2006.01)
(52) U.S. Cl. .................................. 705/5; 705/6
(58) Field of Classification Search ................ 705/8, 5
See application file for complete search history.

(56) References Cited

U.S. PATENT DOCUMENTS

| | | | | |
|---|---|---|---|---|
| 5,918,209 | A | * | 6/1999 | Campbell et al. ............... 705/5 |
| 6,134,500 | A | * | 10/2000 | Tang et al. .................... 701/202 |
| 6,314,361 | B1 | * | 11/2001 | Yu et al. ....................... 701/120 |
| 6,393,359 | B1 | * | 5/2002 | Flynn et al. ................... 701/120 |
| 6,598,029 | B1 | | 7/2003 | Johnson et al. |
| 6,804,658 | B2 | * | 10/2004 | Lim et al. ....................... 705/10 |
| 2002/0013718 | A1 | * | 1/2002 | Cornwell ........................ 705/5 |
| 2003/0055689 | A1 | * | 3/2003 | Block et al. .................... 705/5 |
| 2005/0033616 | A1 | * | 2/2005 | Vavul et al. .................... 705/5 |
| 2005/0044004 | A1 | * | 2/2005 | McKelvey ..................... 705/26 |

FOREIGN PATENT DOCUMENTS

WO WO 0159652 A2 * 8/2001

OTHER PUBLICATIONS

Nwana, "Software Agents: An Overview" Knowledge Engineering Review, vol. 11; No. 3 pp. 1-40, Sep. 1996.*
J. Langerman, et al.; "An Agent Organisation Structure for Airline Scheduling"; presented at the 32$^{nd}$ International Conference on Computers and Industrial Engineering on Aug. 11-13, 2003 in City of Limerick, Ireland; pp. 1-6.
J. Langerman, et al; "Agent-Based Airline Scheduling"; Computers and Industrial Engineering, vol. 33, No. 3-4, Dec. 1997; pp. 1127-1130.
M. Kolp, et al.; "A Goal-Based Organizational Perspective on Multi-Agent Architectures"; in Proceedings of the Eighth International Workshop on Agent Theories, Architectures and Languages, ATAL '01, Seattle, Washington, USA, Aug. 1-3, 2001; pp. 1-13.
W. Shen, et al.; "Agent-Based Systems for Intelligent Manufacturing: A State-of-the-Art Survey"; http://imsg.enme.ucalgary.ca/publication/abm.htm; pp. 1-28.

* cited by examiner

*Primary Examiner* — John W Hayes
*Assistant Examiner* — Tonya Joseph

(57) ABSTRACT

Airline scheduling may be performed using software agents that participate in a mediated auction. To schedule flights, agents are used to represent airports and aircraft in the process of scheduling aircraft to service flights between airports. Airport agents represent airports that have made requests for flights. Aircraft agents represent aircraft that may be scheduled to service a flight from one airport to another airport. An aircraft agent submits a bid to service a flight. Bids received from multiple aircraft agents for a flight are evaluated and aircraft are selected based on the demand of passengers for the flight, the cost of the aircraft corresponding to the bidding aircraft agents to perform the flight, and the minimization of aircraft costs across all flights being scheduled. A resource manager agent helps to ensure that an aircraft agent does not bid for a flight when the aircraft represented by the aircraft agent is in need of maintenance or is unprofitable.

11 Claims, 6 Drawing Sheets

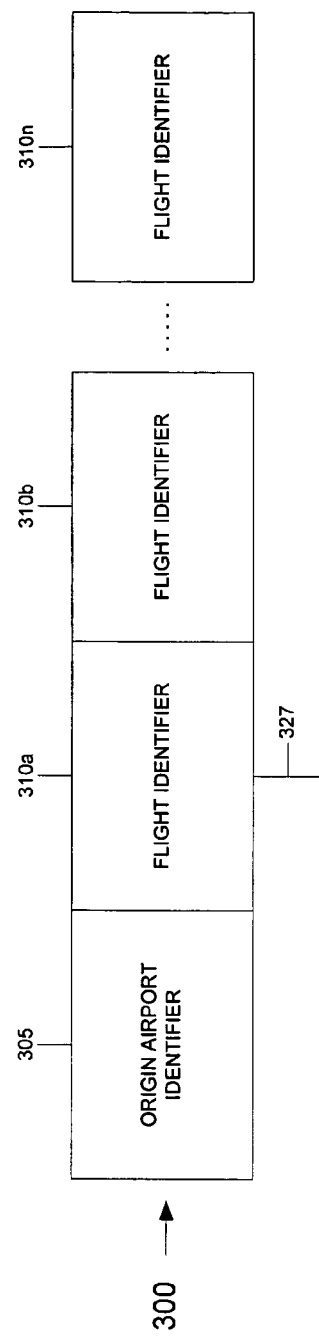
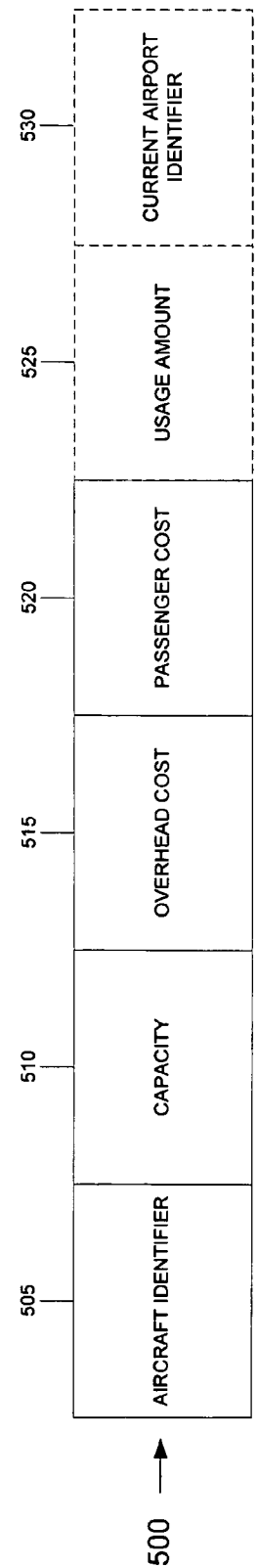
FIG. 3
FIG. 5

400A

| FLIGHT IDENTIFIER | DESTINATION AIRPORT IDENTIFIER | FLIGHT TIME | PASSENGER NUMBER | |
|---|---|---|---|---|
| FLIGHT 1 | CAPE TOWN | 7:00 AM | 100 | ← 425a |
| FLIGHT 2 | DURBAN | 7:00 AM | 50 | ← 425b |
| FLIGHT 3 | CAPE TOWN | 8:00 AM | 120 | ← 425c |
| FLIGHT 4 | DURBAN | 8:00 AM | 70 | ← 425d |
| FLIGHT 5 | CAPE TOWN | 9:00 AM | 110 | ← 425e |
| FLIGHT 6 | DURBAN | 9:00 AM | 60 | ← 425f |

405 → FLIGHT IDENTIFIER; 410 → DESTINATION AIRPORT IDENTIFIER; 415 → FLIGHT TIME; 420 → PASSENGER NUMBER

| FLIGHT IDENTIFIER | DESTINATION AIRPORT IDENTIFIER | FLIGHT TIME | PASSENGER NUMBER | |
|---|---|---|---|---|
| FLIGHT 1 | JOHANNESBURG | 7:00 AM | 150 | ← 425g |
| FLIGHT 2 | DURBAN | 7:00 AM | 75 | ← 425h |
| FLIGHT 3 | JOHANNESBURG | 8:00 AM | 170 | ← 425i |
| FLIGHT 4 | DURBAN | 8:00 AM | 105 | ← 425j |
| FLIGHT 5 | JOHANNESBURG | 9:00 AM | 150 | ← 425k |
| FLIGHT 6 | DURBAN | 9:00 AM | 95 | ← 425l |

| FLIGHT IDENTIFIER | DESTINATION AIRPORT IDENTIFIER | FLIGHT TIME | PASSENGER NUMBER | |
|---|---|---|---|---|
| FLIGHT 1 | JOHANNESBURG | 7:00 AM | 80 | ← 425m |
| FLIGHT 2 | CAPE TOWN | 7:00 AM | 80 | ← 425n |
| FLIGHT 3 | JOHANNESBURG | 8:00 AM | 100 | ← 425o |
| FLIGHT 4 | CAPE TOWN | 8:00 AM | 100 | ← 425p |
| FLIGHT 5 | JOHANNESBURG | 9:00 AM | 90 | ← 425q |
| FLIGHT 6 | CAPE TOWN | 9:00 AM | 90 | ← 425r |

| AIRCRAFT IDENTIFIER (605) | CAPACITY (610) | OVERHEAD COST (615) | PASSENGER COST (620) | |
|---|---|---|---|---|
| 1 | 200 | 400 | 10 | ← 625a |
| 2 | 150 | 300 | 10 | ← 625b |
| 3 | 150 | 300 | 10 | ← 625c |
| 4 | 100 | 200 | 10 | ← 625d |
| 5 | 100 | 200 | 10 | ← 625e |
| 6 | 50 | 100 | 10 | ← 625f |

| FLIGHT TIME (705) | ORIGIN AIRPORT (710) | DESTINATION AIRPORT (715) | AIRCRAFT IDENTIFIER (720) | |
|---|---|---|---|---|
| 6:00 AM | JOHANNESBURG | CAPE TOWN | 1 | ← 725a |
| 6:00 AM | JOHANNESBURG | DURBAN | 2 | ← 725b |
| 6:00 AM | JOHANNESBURG | CAPE TOWN | 3 | ← 725c |
| 6:00 AM | JOHANNESBURG | DURBAN | 5 | ← 725d |
| 7:00 AM | JOHANNESBURG | CAPE TOWN | 4 | ← 725e |
| 7:00 AM | JOHANNESBURG | DURBAN | 6 | ← 725f |
| 7:00 AM | CAPE TOWN | JOHANNESBURG | 1 | ← 725g |
| 7:00 AM | DURBAN | JOHANNESBURG | 2 | ← 725h |
| 7:00 AM | CAPE TOWN | DURBAN | 3 | ← 725i |
| 7:00 AM | DURBAN | CAPE TOWN | 5 | ← 725j |

USING SOFTWARE AGENTS TO SCHEDULE AIRLINE FLIGHTS

TECHNICAL FIELD

This description relates to airline scheduling using intelligent agents participating in a mediated auction.

BACKGROUND

Commercial airlines have a need to schedule aircraft to fly particular routes at particular days and times (which may be referred to as flights) between airports. Scheduling an aircraft for a particular flight or a leg of a flight may involve satisfying the demand by passengers for the particular flight, or a particular leg of a particular flight, within certain operational requirements, including the physical restrictions of the aircraft flying the flights, aircraft locations, and the airport location.

SUMMARY

In one general aspect, airline flights are scheduled using airport software agents, aircraft software agents, and an allocation manager software agent. The allocation manager software agent uses an assignment methodology to assign aircraft software agents to flights from airports represented by airport software agents. The assignment methodology attempts to minimize the cost of a particular flight and to minimize costs across all of the flights. Each airport software agent represents an airport in a geographic location, is identified by an airport identifier, and has flight information for flights identified as departing from the airport represented by the airport software agent. The flight information includes a flight identifier, an indication of a destination airport, an indication of a departure time, and a number of passengers for the flight. Each airport software agent is operable to communicate flight information to the allocation manager software agent for flights that are not assigned an aircraft software agent and need to be scheduled. Each aircraft software agent represents an aircraft and is identified by an aircraft identifier. Each aircraft software agent includes a passenger capacity, an overhead cost for each flight regardless of the number of passengers on the flight, and a passenger cost for each passenger on a flight. Each aircraft software agent is operable to receive flight information from the allocation manager software agent for flights that the allocation manager software agent is scheduling, and is operable to submit a bid to the allocation manager software agent to service one of the flights that the allocation manager software agent is scheduling.

Implementations may include one or more of the following features. For example, assigning an aircraft software agent to a flight also may include having the allocation manager software agent determine a cost for a flight performed by each aircraft submitting a bid and tentatively assign the lowest cost aircraft to the flight. When all flights have been tentatively scheduled, the allocation manager may compare overall cost of all of the flights with a predetermined cost parameter, and schedule the aircraft based on the tentative assignment. The predetermined cost parameter may include an optimal cost of servicing all of the flights that is determined by running an optimization algorithm across all of the tentatively scheduled flights. The optimization algorithm may be a genetic algorithm.

A resource manager software agent may be associated with the aircraft software agents. The resource manager software agent may help manage the aircraft software agents by enabling and disabling aircraft software agents based on the perceived need of the aircraft represented by the aircraft software agents to fly flights from the airports represented by the airport software agents. The resource manager resource agent also may monitor maintenance requirements of the aircraft represented by the aircraft software agents by preventing aircraft software agents that represent aircraft that need maintenance from submitting bids to service the flights.

When disruptions render aircraft represented by an aircraft software agent to which a flight is assigned originally to service the flight unable to service the flight, an operations manager software agent may be used to reassign another aircraft software agent to the flight.

Each airport software agent may represent a simulated airport or an actual airport. Similarly, each aircraft software agent may represent a simulated aircraft or an actual aircraft.

Flights may be scheduled to model flights to be flown by simulated aircraft represented by the aircraft software agent between simulated airports represented by the airport software agents. Flights to be flown by actual aircraft represented by the aircraft software agents between actual airports represented by the airport software agents also may be scheduled.

In another general aspect, flights from between multiple airports are scheduled to move passengers between the airports. An indication of flights to depart from an airport is received. Each flight indication includes an indication of a number of passengers traveling on the flight, an indication of a time at which the flight departs, and an indication of a destination for the flight. The indication of the flights is provided to aircraft that may service the flights. Each aircraft is represented by a passenger capacity, an overhead cost for each flight flown by the aircraft regardless of the number of passengers on the flight, and a passenger cost for each passenger on the flight. Bids are received from each of the aircraft to service each of the flights. Each bid from an aircraft to service a flight represents the cost for the aircraft to service the flight. Each of the flights is assigned to one of the aircraft based on locations of the aircraft, bids received for the flights, and cost of the overall assignment of flights to aircraft.

Implementations may include one or more of the features noted above and one or more of the following features. For example, a model of a flight schedule may be created or actual flights to be flown may be scheduled. A determination may be made as to whether an aircraft from which a bid is received is available to service the flights. The determination may include determining if the aircraft is in need of maintenance or determining if the aircraft has flown for a maximum allowable number of hours since previous maintenance. The flight may be reassigned to another aircraft in response to a disruption in the availability of the aircraft to which the flight is assigned originally.

Receiving a bid to service the flight from each of the aircraft may include an indication of an amount of money to be paid to the aircraft if the aircraft services the flight. An indication of an amount of money to be paid to the aircraft may include an overhead charge and a per passenger charge to be paid to the aircraft if the aircraft services the flight. Assigning each of the flights to one of the aircraft based on the overall assignment of flights to aircraft may include assigning aircraft to the flights such that the amount of money to be paid to the aircraft is minimized. Assigning each of the flights to one of the aircraft based on the overall assignment of flights to aircraft also may include assigning each of the flights to the aircraft with a minimum amount of unused capacity on the flight or based on the effect of the assignment to other assignments of aircraft to flights. The aircraft that may service the flights may be specified through addition and deletion of aircraft from a set of aircraft that are available to service the flights. Implementations of any of the techniques discussed above may include a method or process, a system or apparatus, or computer software on a computer-accessible medium.

The details of one or more implementations are set forth in the accompanying drawings and description below. Other features will be apparent from the description and drawings, and from the claims.

DESCRIPTION OF DRAWINGS

FIGS. 3 and 5 are block diagrams illustrating example data structures for use in agent-based airline scheduling.

FIGS. 4A-4C are block diagrams of representations of example flight information.

FIG. 6 is a block diagram of a representation of example aircraft information.

FIG. 7 is a block diagram of a representation of an airline schedule created as a result of a mediated auction using the process of FIG. 2A and the information of FIGS. 4A-4C and 6.

DETAILED DESCRIPTION

Airline scheduling may be performed using software agents that participate in a mediated auction. Conventionally, a software agent (which may be referred to more simply as an agent) is a computer program that performs a processing task or information gathering task. Often the term agent may be used to describe a computer program for an automatic process that is able to communicate with other computer programs (or agents) to perform some processing or information gathering task. Agents may be used to implement, simulate or represent autonomous real-life entities.

In the discussion below, the term "flight" will be used to refer to a logical entity that includes an origin airport, a destination airport, and a time of departure. To schedule flights, agents are used to represent airports and aircraft in the process of scheduling aircraft to service flights between airports. Airport agents represent airports that have made requests for flights. Aircraft agents represent aircraft that may be scheduled to service a flight from one airport to another airport. An aircraft agent submits a bid to service a flight (i.e., the aircraft agent submits a request for the aircraft represented by the aircraft agent to fly passengers between two airports). The bids received from multiple aircraft agents for a flight are evaluated and aircraft are selected based on the demand of passengers for the flight, the cost of the aircraft corresponding to the bidding aircraft agents to perform the flight, and the minimization of aircraft costs across all flights being scheduled. Therefore, in some cases, an aircraft may be assigned to a flight even when the aircraft does not correspond to the least expensive bid for that flight.

Aircraft agents are organized into groups, with each group of aircraft agents being associated with a resource manager agent. The resource manager agent is responsible for ensuring that an aircraft agent does not bid for a flight when the aircraft represented by the aircraft agent is in need of maintenance. The resource manager agent also is responsible for identifying aircraft agents that are having difficulty winning bids for flights and taking appropriate action, such as disabling the aircraft agent so that the aircraft agent is no longer used to bid on subsequent flights.

Figure 1:
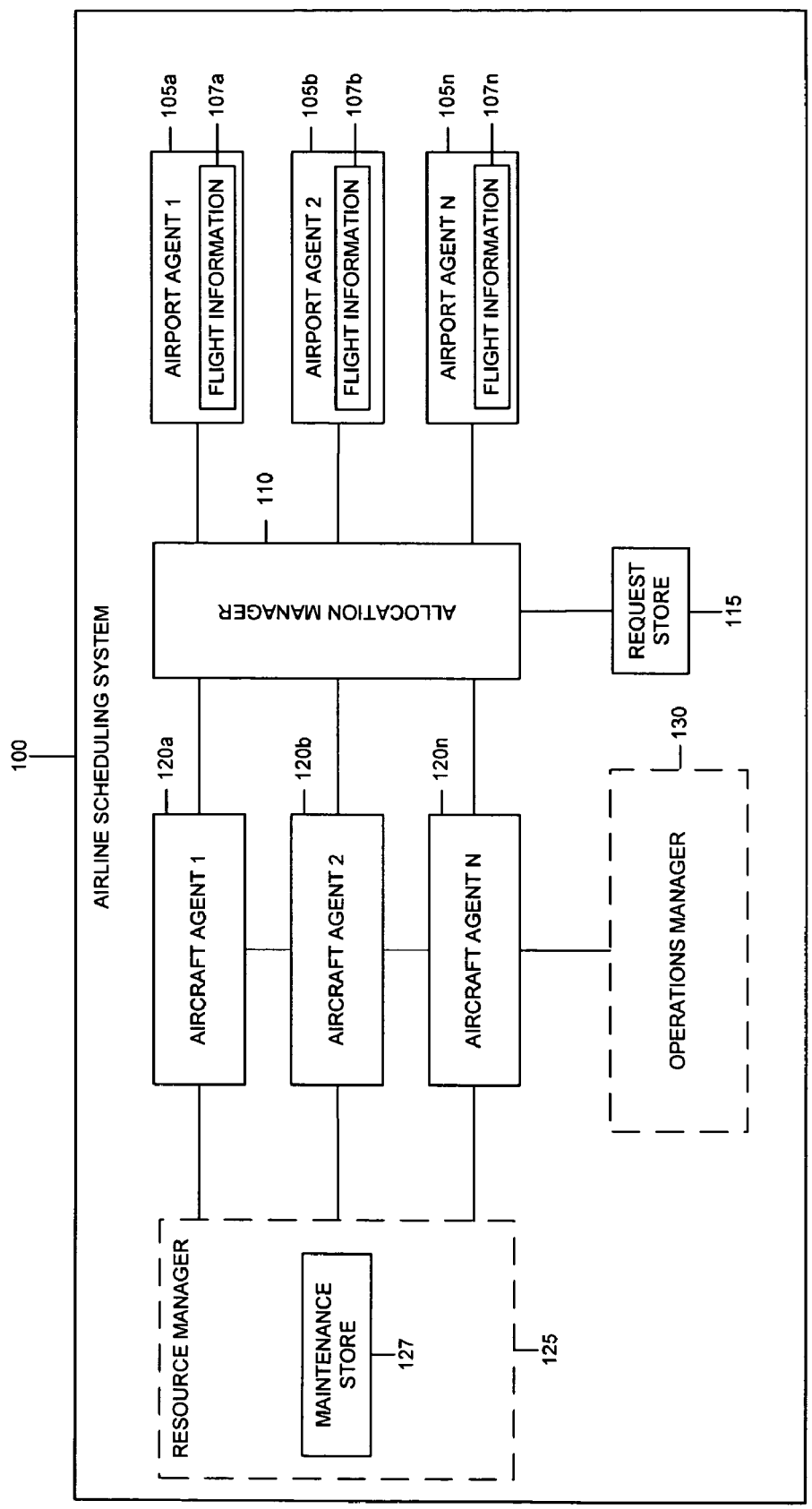
FIG. 1 is a block diagram of a computer system including agents that perform airline scheduling through participation in a mediated auction.

Referring to FIG. 1, an airline scheduling system 100 includes multiple agents of different types that participate in a mediated auction to schedule flights for an airline. The airline scheduling system 100 includes multiple airport agents 105a-105n, each of which represents a physical airport for which flights need to be scheduled. Each flight from an airport represented by an airport agent is associated with a demand representing a number of passengers for the flight. The airport agents 105a-105n each include flight information 107a-107n that describes the flights from the corresponding airport.

The airport agents 105a-105n communicate with an allocation manager agent 110 that includes a request store 115 that includes information describing the flights requested from the airports represented by the airport agents 105a-105n. The allocation manager agent 110 also is able to communicate with aircraft agents 120a-120n, each of which represents an aircraft that is available to service a flight described in the request store 115. The aircraft agents 120a-120n submit bids for the flights to the allocation manager agent 110 and the allocation manager agent 110 assigns flights to the aircraft agents based on the received bids.

The aircraft agents 120a-120n also are assigned to and able to communicate with an optional resource manager agent 125 that prevents the aircraft agents 120a-120n from submitting bids to the allocation manager agent 110 when the corresponding aircraft are in need of maintenance based on a maintenance store 127 that identifies when each aircraft is required to receive maintenance. The resource manager agent 125 also may disable particular ones of the aircraft agents 120a-120n if the corresponding aircraft are unnecessary in servicing the flights, as evidenced by the inability to win assignments to flights over a period of time. In addition, the resource manager agent adds additional aircraft agents if more aircraft are needed to service the flights.

The airline scheduling system 100 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The airline scheduling system 100 may receive instructions from, for example, a software application, a program, a piece of code, a device, a computer, a computer system, or a combination thereof, which independently or collectively direct operations, as described herein. The instructions may be embodied permanently or temporarily in a machine, a component, a piece of equipment, a storage medium, or a propagated signal that is capable of being delivered to the airline scheduling system 100.

Each of the airport agents 105a-105n represents a physical airport from which there are requests for flights. A requested flight represents a number of passengers wishing to leave the airport at a certain time for a certain destination. Each of the airport agents 105a-105n includes flight information 107a-107n that specifies the requested flights from the corresponding airport. The requested flights from the airport may be summarized with a request matrix. For example, the request matrix in the flight information 107a for an airport named Airport 1 and represented by the airport agent 105a may look like the following Table 1.

TABLE 1

| Departure Time | To Airport 2 | To Airport 3 |
|---|---|---|
| 7:00 AM | 100 | 180 |
| 8:00 AM | 70 | 100 |

This request matrix indicates that 100 passengers wish to leave Airport 1 for Airport 2 at 7:00 AM, 180 passengers wish to leave Airport 1 for Airport 3 at 7:00 AM, 70 passengers wish to leave Airport 1 for Airport 2 at 8:00 AM, and 100 passengers wish to leave Airport 1 for Airport 3 at 8:00 AM. The request matrix for the airport named Airport 1 is transferred by the airport agent 105a to the allocation manager agent 110 for inclusion in the request store 115. In this manner, the requested flights for all of the airports represented by the airport agents 105a-105n may be specified in demand matrices in the flight information 107a-107n and transferred to the allocation manager agent 110 for inclusion in the request store 115

The allocation manager agent 110 makes the information stored in the request store 115 available to the aircraft agents 120a-120n. Each of the aircraft agents 120a-120n represents a real aircraft that has a capacity to carry a certain number of passengers. Each aircraft agent has a per flight cost structure that includes a fixed overhead cost plus an incremental cost per passenger. In general, a smaller capacity aircraft has a smaller overhead cost per flight. The aircraft agents 120a-120n may submit bids to the allocation manager agent 110 for the flights defined in the request store 115 based on the cost for the corresponding aircraft to service the flights. In certain implementations, the aircraft agents 120a-120n are only permitted to submit bids for flights with a number of passengers less than the capacity of the corresponding aircraft.

The allocation manager agent 110 receives the bids from the aircraft agents 120a-120n and creates a flight schedule based on the received bids. The allocation manager agent 110 creates the schedule to satisfy the requests specified in the request store 115 while maximizing profits, which may be defined as revenue minus costs. The revenue includes a fee that is received for each passenger that is flown on a flight. The costs include the cost of flying the passengers on the flights using the aircraft represented by the aircraft agents 120a-120n. The cost of a flight is equal to the value of the bid submitted by the aircraft agent corresponding to the aircraft that services the flight.

Consequently, the allocation manager agent 110 creates a schedule that includes as many passengers on flights as possible while flying as few flights as possible. Therefore, each flight is assigned to an aircraft from which a bid is received that has the lowest overhead and that can fly the most passengers. In other words, a flight is generally assigned to the aircraft from which a bid is received that has the least unused passenger capacity. Because the allocation manager agent 110 attempts to globally minimize the amount of money paid to have the aircraft service all of the flights, the allocation manager agent 110 may not always follow such a rule when identifying an aircraft to assign to a flight. Therefore, a flight may not be assigned to an aircraft that would maximize the profit received from that particular flight when assigning that aircraft to the flight does not result in the global maximization of the profit received from service of all of the flights. In another implementation, the flight is assigned to the aircraft that minimizes the number of passengers requesting the flight that are not carried on the flight and the number of empty seats on the aircraft during the flight.

The resource manager agent 125 manages the fleet of aircraft represented by the aircraft agents 120a-120n. Each of the aircraft agents 120a-120n contracts directly with the resource manager agent 125. The resource manager agent 125 may add or remove aircraft agents based on the perceived need for the corresponding aircraft. More particularly, if the represented aircraft are unable to completely service all of the requested flights, then the resource manager agent 125 adds new aircraft agents that correspond to additional aircraft that may service the previously unsatisfied demand. If an aircraft is deemed to be unnecessary to service the requested flights, then the resource manager agent 125 removes or disables the corresponding aircraft agent, thereby preventing the aircraft from being assigned to future flights. As new or better aircraft become available, the resource manager agent 125 may add the corresponding aircraft agents to the set of aircraft agents 120a-120n. Alternatively, the resource manager agent 125 may replace the aircraft agents 120a-120n with the aircraft agents corresponding to the new or better aircraft.

The aircraft represented by the aircraft agents 120a-120n are governed by regulatory requirements for regular maintenance. In general, each aircraft type may be required to receive period maintenance of a predetermined type and of a predetermined duration. The resource manager agent 125 is responsible for ensuring that the aircraft agents 120a-120n adhere to the regulatory requirements. The resource manager agent 125 includes a maintenance store 127 that identifies when the aircraft governed by the resource manager agent 125 are required to receive maintenance. More particularly, the maintenance store 127 stores a time since maintenance was last received for each aircraft managed by the resource manager agent 125. When a flight is assigned to an aircraft, the length of the flight is added to the entry for the aircraft in the maintenance store 127. When the entry in the maintenance store 127 for an aircraft indicates that the aircraft has reached the regulatory limit on time since maintenance was last received, the resource manager agent 125 prevents the corresponding aircraft agent from being assigned to flights that occur while maintenance is to be performed on the aircraft.

In one implementation, the airline scheduling system 100 includes multiple resource manager agents 125. Each of the resource manager agents 125 may correspond to a subset of the aircraft agents 120a-120n. In such an implementation, each resource manager agent 125 is responsible for monitoring the aircraft corresponding to the aircraft agents that are under the control of the resource manager agent 125, which includes monitoring maintenance requirements, workload, and efficiency of the aircraft.

In some implementations, the airline scheduling system 100 also includes an optional operations manager agent 130 that is able to communicate with the aircraft agents 120a-120n. The operations manager agent 130 is responsible for schedule reallocation in response to disruptions of the schedule that has been created by the allocation manager agent 110. The operations manager agent 130 ensures that the schedule is flown with the least amount of disruptions possible. A schedule disruption may include a change in the availability of an aircraft to service a flight to which the aircraft is assigned. An aircraft may be made unavailable to service a flight by weather conditions that prevent the aircraft from flying. The aircraft also may be made unavailable by unexpected maintenance or by changes in the availability of a crew that was supposed to operate the aircraft during the flight. The operations manager agent 130 may respond to such a disruption by assigning the flight to a different aircraft that is available to service the flight using conventional scheduling techniques or techniques substantially similar to the ones used by the allocation manager agent 110.

One implementation of the operations manager agent 130 includes an expert system. The expert system searches through a set of possible operations, each of which represents a possible solution to the schedule disruption. An operation is chosen based on a calculated cost of the operation. The cost includes operational penalties, such as total flight delay and number of delayed flights, commercial penalties, such as the number of misconnected passengers, and financial penalties, such as the cost of extra fuel or passenger accommodations. The operation with the least cost is chosen as the solution to the schedule disruption.

The allocation manager agent 110 is generally used for long term scheduling to create schedules well in advance of when the flights in the schedule are to be flown. In contrast, the operations manager agent 130 is generally used for short term scheduling to make changes to the schedule closer to when the flights in the schedule are to be flown. However, the allocation manager agent 110 also may be used for short term scheduling.

The airline scheduling system 100 may be used for multiple purposes. For example, the airline scheduling system 100 may be used as a simulation or modeling tool for scheduling flights for an airline under different conditions. In such a case, the data used by the airline scheduling system 100 describing the requested flights, the available aircraft, and the regulatory requirements may be based on historical information from the airline, on some other model of the data, or on estimation of the data. The airline scheduling system 100 also may be used for real time schedule generation for the airline. The schedule created by the airline schedule process may be used by the airline, in which case the data used comes directly from the airline and represents real flight demand, aircraft availability, and regulatory requirements.

Figure 2A:
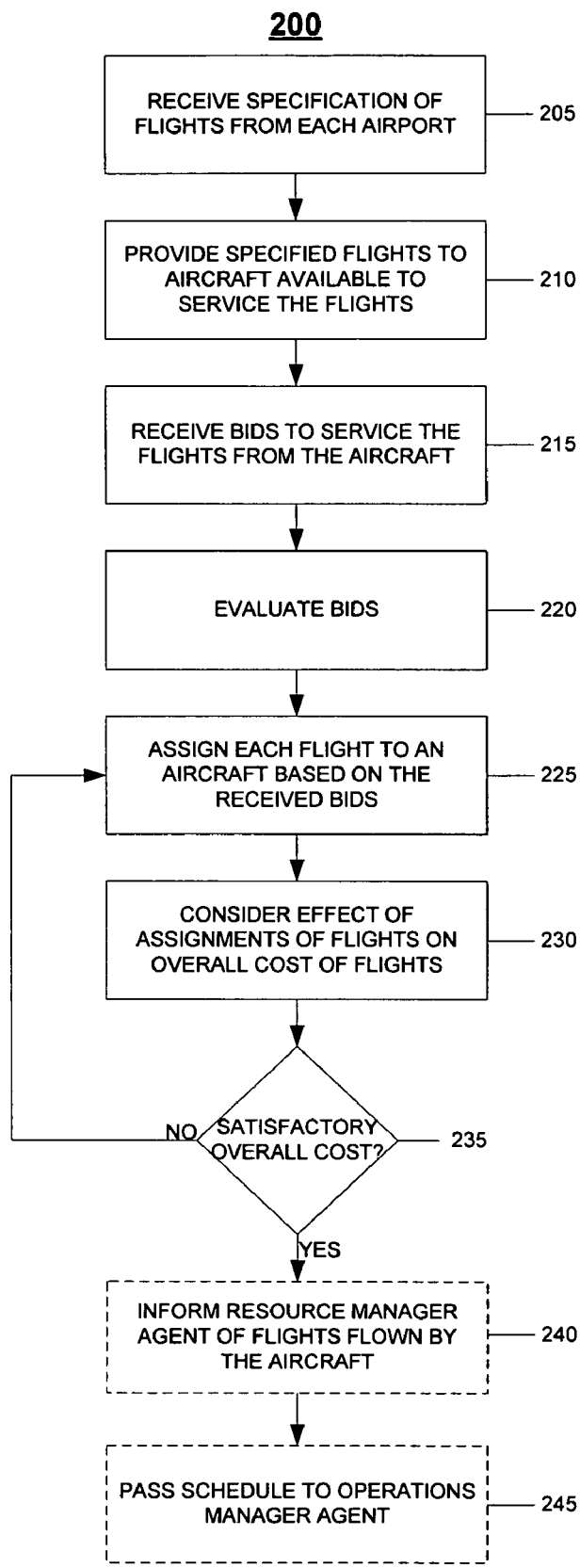
FIG. 2A is a flow chart of a process for mediating an auction for flights in an airline schedule.

Referring to FIG. 2A, a process 200 is executed by the allocation manager agent 110 of FIG. 1 to create a flight schedule for a commercial airline. In general, the allocation manager agent mediates an auction between a set of airport agents and a set of aircraft agents. The airport agents represent a set of airports from which flights are requested, and the aircraft agents represent aircraft available to service the requested flights. The aircraft agents submit bids for the flights, and the allocation manager agent uses the received bids in creating a schedule of flights based on the received bids that maximizes the profits of the airline.

The process 200 begins when the allocation manager agent receives a specification of flights requested from each airport (step 205). The specification of flights from an airport is received from the airport agent that represents the airport. For example, each airport agent may send the allocation manager agent a request matrix that specifies the flights requested from the corresponding airport. Each flight may be represented by a number of passengers wishing to leave the airport at a certain time for a certain airport destination. The specifications of flights from the airport agents are stored in a single location, such as the request store 115 of FIG. 1.

The allocation manager agent provides the specified flights to the aircraft agents (step 210). In one implementation, the allocation manager agent provides the specified flights to the aircraft agents by transferring a copy of the received specifications of flights to each of the aircraft agents. In another implementation, the allocation manager agent provides the specified flights to the aircraft agents by providing the aircraft agents with access to the single location where the specifications of flights are stored by the allocation manager agent.

Based on the specified flights, the aircraft agents submit bids to service the flights to the allocation manager agent, and the allocation manager agent receives the bids (step 215). The value of a bid submitted by an aircraft agent for a flight may depend on the overhead and per passenger costs of the aircraft represented by the aircraft agent. More particularly, the value of the bid may be the overhead cost plus the per passenger cost multiplied by the number of passengers that are to be on the flight.

The allocation manager agent evaluates the bids (step 220) and creates a flight schedule by assigning flights to aircraft represented by aircraft agents that submitted bids for the flights. In order to create the schedule, the allocation manager agent assigns each requested flight to an aircraft based on the received bids (step 225). In one implementation, when identifying an aircraft to assign to a flight, the allocation manager agent identifies the aircraft represented by an aircraft agent that submitted a bid for the flight that services the flight with the least amount of unused aircraft capacity. Doing so minimizes the overhead cost of the flight and maximizes the profit received from the flight. In addition, the allocation manager agent considers the physical limitations of the aircraft for which bids have been submitted when assigning aircraft to flights. For example, the allocation manager agent does not assign an aircraft to multiple simultaneous flights even if the aircraft maximizes the profit received from the multiple simultaneous flights because the aircraft cannot service the multiple simultaneous flights at the same time.

After assigning each flight to an aircraft, the allocation manager agent considers the effect of the assignments on the overall cost of servicing the flights (step 230). More particularly, the allocation manager agent determines if the overall cost of servicing the flights is satisfactory (step 235). Determining if the overall cost of servicing the flights is satisfactory may include running an optimization process across the flights after an aircraft has been assigned to each of the flights. The optimization process may identify an optimal cost of servicing the flights, and the overall cost of servicing the flights may be satisfactory if the overall cost is equal to the optimal cost. In one implementation, the optimization process is a genetic algorithm. The cost of servicing the flights is satisfactory if the assignment maximizes the profit received over all of the flights to be serviced. If the overall cost is not determined to be satisfactory, then the allocation manager agent creates a different assignment of aircraft to requested flights (step 225) and again considers the effect of the new assignment on the overall cost of servicing the flight (step 230). In this manner, the different assignments of aircraft to requested flights are created until an assignment is identified that maximizes the overall profit received from servicing the requested flights.

When the system includes a resource manager agent, the allocation manager agent may inform the resource manager agent, such as the resource manager agent 125 of FIG. 1, of the flights flown by the aircraft (step 240). Alternatively, the resource manager agent may request a copy of the flight schedule from the allocation manager agent, and the allocation manager agent may send the resource manager agent a copy of the schedule. If the resource manager agent determines that there are too many aircraft available to service flights, then the resource manager agent may disable some of the aircraft agents, which may be referred to as firing the corresponding aircraft. Similarly, if the resource manager agent determines that there are not enough aircraft available to service flights, then the resource manager agent may add additional aircraft agents and allow the additional aircraft agents to bid for flights, which may be referred to as hiring the aircraft corresponding to the additional aircraft agents. Based on the flights flown in the schedule, the resource manager agent may update calculations of when the aircraft agents should be prevented from submitting bids for flights due to regulatory requirements. For example, if the flights serviced by an aircraft result in the aircraft having flown for the maximum allowable amount of time between overhauls, the resource manager agent may prevent the aircraft agent corresponding to the aircraft from submitting bids for subsequent flights until the aircraft is overhauled. The manner in which the resource manager agent manages the available aircraft is described below with respect to FIG. 2B.

The allocation manager agent also may optionally pass the schedule to an operations manager, such as the operations manager agent 130 of FIG. 1 (step 245). The operations manager agent ensures that the schedule is flown with the least amount of disruptions possible. The operations manager agent may reassign flights within the schedule in response to changes in the availability of the aircraft to service the flights. An aircraft may be made unavailable to service a flight by weather conditions that prevent the aircraft from flying. The aircraft also may be made unavailable by unexpected maintenance or by changes in the availability of a crew that was supposed to operate the aircraft during the flight.

In some implementations, a requested flight from an airport may not be able to be serviced because no aircraft are present at the airport to service the flight. In particular, this problem may arise for flights early in the day from the airport before any, or only a few, other flights to the airport have arrived. The allocation manager agent identifies a flight from an airport at which no aircraft are present to service the flight and adds an additional flight to the set of flights for which bids are solicited. The additional flight is from an airport where an aircraft is available to the airport where no aircraft are available. The aircraft that flies the additional flight then services the flight for which no aircraft were originally available. The additional flight is at a time prior to the flight for which the aircraft is needed such that the aircraft has ample time to travel to the airport from which the flight is to depart. For example, all planes may be located originally at a first airport. In order for flights from any other airports to be serviced, the allocation manager agent solicits bids for additional flights from the first airport to the other airports in advance of the departure of flights from the other airports. If unavoidable, the aircraft that services the additional flight may not carry any passengers while flying to the airport at which an aircraft is needed.

Figure 2B:
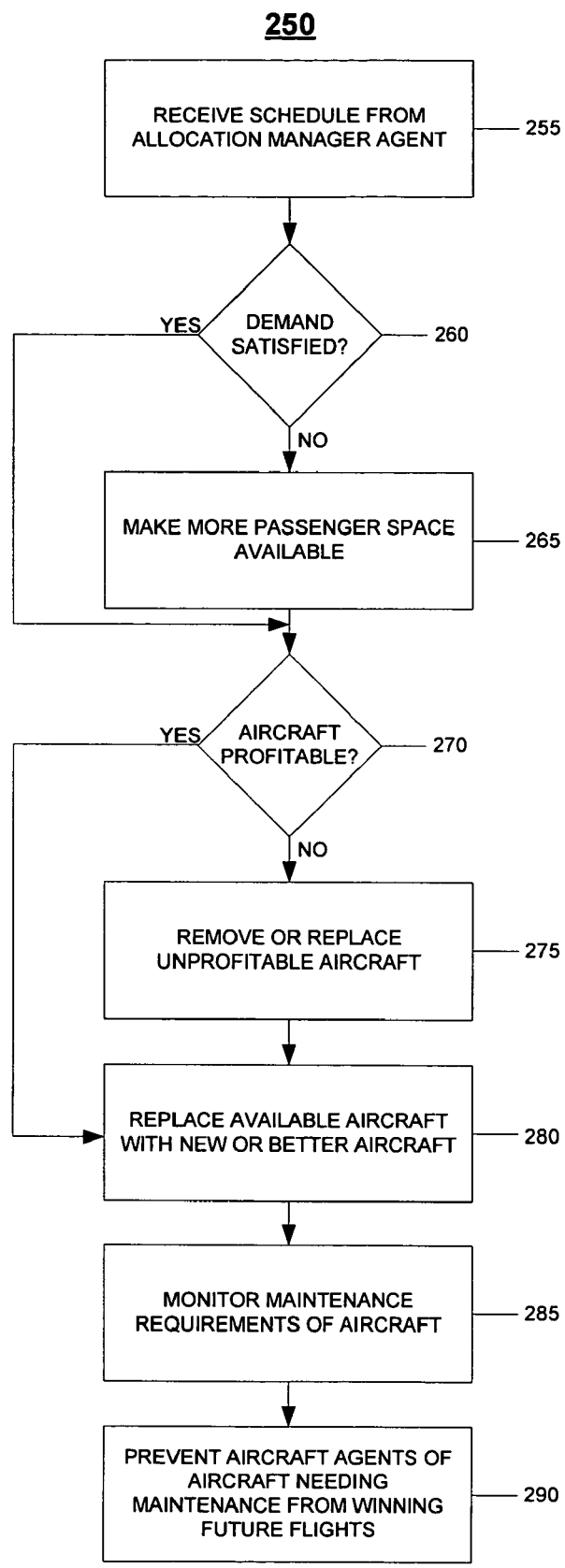
FIG. 2B is a flow chart of a process for managing aircraft that service flights in an airline schedule.

Referring to FIG. 2B, a process 250 is executed by a resource manager agent, such as the resource manager agent 125 of FIG. 1, to manage the aircraft that service the flights in the schedule created by an allocation manager agent through the execution of the process 200 of FIG. 2A. The resource manager agent ensures that a proper number of aircraft are available to service the flights scheduled by the allocation manager agent. In other words, the resource manager agent verifies that enough aircraft are available to service the requested flights while ensuring that no aircraft are unnecessarily idle as the flights are being serviced. The resource manager agent also ensures that the aircraft adhere to regulatory requirements for regular maintenance such that an aircraft and the corresponding aircraft agent do not submit bids for and service flights when the aircraft is to receive maintenance.

The process 250 begins when the resource manager agent receives a schedule of flights from the allocation manager agent (step 255). The schedule may be created as a result of an auction that is mediated by the allocation manager agent. During the mediated auction, aircraft agents representing aircraft submit bids for flights requested by airport agents that represent airports requesting the flights. The allocation manager agent creates the schedule by assigning the flights to the represented aircraft such that the cost of servicing the requested flights is minimized.

The aircraft used in the schedule created by the allocation manager agent may lead to a sub-optimal schedule, and a different set of aircraft may better service all of the requested flights. The resource manager agent modifies the set of available aircraft based on the received schedule such that future schedules that are created more optimally use the available aircraft to minimize the cost of servicing the requested flights. More particularly, the resource manager agent determines if the demand for flights is satisfied by the schedule (step 260). The resource manager agent may determine if the demand is satisfied by determining if all of the requested flights are completely serviced in the schedule. A flight may not be completely serviced if an aircraft is not available to service the flight or if the aircraft that does service the flight does not have enough passenger capacity to carry all of the passengers that requested the flight. If the resource manager agent identifies such a condition, then the demand is not satisfied and the resource manager agent makes more passenger space available for flights in schedules that are created in the future (step 265). Making more passenger space available may include making additional aircraft available to service flights in future schedules or replacing available aircraft with new aircraft that have higher passenger capacities. The resource manager agent may add enough new or larger aircraft to the set of available aircraft until the available aircraft would have satisfied the demand in the schedule received from the allocation manager agent.

In addition, the resource manager agent determines if the available aircraft are sufficiently profitable (step 270). An unprofitable aircraft may have passenger space that is not used while servicing the flights in the schedule. Passenger space refers to the capacity of the available aircraft to transport passengers, both in the number of passengers that may be carried by the aircraft and in the speed at which the passengers are carried. If the resource manager agent determines that the available aircraft are not sufficiently profitable, then the resource manager agent may remove or replace unprofitable aircraft to prevent the unprofitable aircraft from being assigned to flights in future schedules (step 275). Removing or replacing the unprofitable aircraft decreases the amount of passenger space available for use in the future schedules, which may increase overall profitability of the available aircraft. For example, multiple unprofitable aircraft may be replaced with a larger aircraft having a greater passenger capacity. This may be useful, for instance, when a single aircraft may be used to more efficiently service multiple flights in the schedule previously assigned to multiple aircraft. In such a case, the resource manager agent may replace the multiple aircraft with the single aircraft. Doing so may make less passenger space available over all the flights and thereby may increase the overall profitability of the available aircraft. Similarly, if a flight may be serviced by an aircraft with a smaller passenger capacity than the aircraft to which the flight is assigned, the resource manager agent may replace the larger capacity plane with the smaller capacity plane to decrease the amount of passenger space available and to increase the overall profitability of the available aircraft.

In addition, the resource manager agent may change the set of available aircraft without reference to the received schedule. For example, the resource manager agent may replace some of the currently available aircraft with newer or otherwise better aircraft (step 280). A better aircraft may be an aircraft that requires maintenance less often, an aircraft with a higher passenger capacity, or an aircraft that flies at a higher speed. The better aircraft may be better used in future schedules and may lead to a lower overall cost of servicing the requested flights. For every aircraft added, either with or without reference to the received schedule, a corresponding aircraft agent is created to represent the added aircraft and submit bids for flights that may be serviced by the added aircraft. Similarly, for every aircraft that is removed, the corresponding aircraft agent is disconnected from the allocation manager agent.

The resource manager agent also makes sure that the available aircraft adhere to regulatory requirements for regular maintenance. For example, each aircraft may be required to receive a major overhaul after every 1000 hours of flight, which makes the aircraft unavailable to service flights for a long period of time. The resource manager agent ensures that the aircraft receive the major overhaul as mandated by the regulatory requirements. More particularly, the resource manager agent monitors the maintenance requirements of the aircraft (step 285). In implementations where the maintenance requirements require that the aircraft be maintained after a threshold amount of flying, the resource manager agent monitors the amount that each aircraft has flown since last receiving maintenance. The flights serviced by the aircraft in the received schedule may push the amount that the aircraft has flown over the threshold amount of flying between overhauls.

When the resource manager agent determines that an aircraft is in need of or is required to receive maintenance, the resource manager agent prevents the aircraft agent corresponding to the aircraft from winning future flights that may be serviced by the aircraft (step 290). Preventing an aircraft agent from winning future flights may include temporarily disabling communication between the aircraft agent and the allocation manager agent. In such a case, the aircraft agent is not made aware of the requested flights, so the aircraft agent does not submit bids for the flights and consequently is not assigned to the requested flights. Preventing an aircraft agent from winning future flights also may include instructing the allocation manager agent not to assign any flights to the aircraft represented by the aircraft agent, regardless of the bids submitted by the aircraft agent.

Referring to FIG. 3, an example airport data structure 300 includes information describing the flights from a particular airport. Each airport agent, such as one of the airport agents 105a-105n of FIG. 1, includes and is associated with an airport data structure 300 that describes the flights requested from the corresponding airport. The airport agent also may send a copy of the airport data structure 300 and associated data to an allocation manager agent, such as the allocation manager agent 110 of FIG. 1. The copy of the airport data structure 300 may be stored in a request store, such as the request store 115 of FIG. 1, or used in the creation of a schedule for servicing the flights described in the airport data structure 300.

The airport data structure 300 includes an origin airport identifier 305 that uniquely identifies the airport from which the flights specified in the airport data structure 300 originate. The origin airport identifier 305 may be used to reference a particular record or data entry using the airport data structure 300, or to access information describing the flights requested from the airport identified by the origin airport identifier 305. The data structure 300 also includes a series of flight identifiers 310a-310n that describe a single flight from the airport indicated by the origin airport identifier 305. Each of the flight identifiers 310a-310n references a particular record or data entry using the flight data structure 320.

The flight data structure 320 includes a flight identifier 325 that uniquely identifies a particular flight. The airport data structure 300 and the flight data structure 320 are associated through use of flight identifiers 310 and 325 that link information from the two data structures 300 and 320, as shown, for example, by the link 327. In other words, a flight data structure 320 is associated with an airport data structure 300 when the flight identifier 325 of the flight data structure 320 matches one of the flight identifiers 310a-310n of the airport data structure 300. The flight identifier 325 is also a means by which the flight data structure 320 may be referenced. The flight data structure 320 includes a destination airport identifier 330 that specifies the destination of the flight represented by the flight data structure 320. In addition, the flight data structure 320 includes a flight time 335 that specifies the time at which the flight represented by the flight data structure 320 is to depart. The flight data structure 320 also includes a passenger number 340 that specifies the number of passengers requesting the flight represented by the flight data structure 320.

Each of the airport identifiers 305 and 330 refers to an airport agent, such as one of the airport agents 105a-105n of FIG. 1. Whether an airport agent represents an origin airport or a destination airport depends on the flight that is being described by a flight data structure 320 and the airport data structure 300 that is associated with the flight data structure 320. More particularly, an airport agent is an origin airport when an origin airport identifier 305 refers to the airport agent. Similarly, an airport agent is a destination airport when a destination airport identifier 330 refers to the airport agent.

FIGS. 4A-4C represent flight information samples 400A, 400B, and 400C. Each of the samples 400A, 400B, and 400C includes flight information for the flights requested from a particular airport. More particularly, the sample 400A includes information describing the flights requested from an airport in Johannesburg, the sample 400B includes information describing the flights requested from an airport in Cape Town, and the sample 400C includes information describing the flights requested from an airport in Durban. The flights described in the samples 400A, 400B, and 400C all occur between the airports in Johannesburg, Cape Town, and Durban. The flights included in each of the samples 400A, 400B, and 400C are described in flight data structures 320 that are referenced by airport data structures 300 that correspond to the Johannesburg airport, the Cape Town airport, and the Durban airport, respectively. The information included in the samples 400A, 400B, and 400C may be transferred to an allocation manger, such as the allocation manager 110 of FIG. 1. The allocation manager agent may store the information in a request store, such as the request store 115 of FIG. 1, and use the information to create a schedule for servicing the described flights. For brevity, only some of the flights originating from each of the airports are shown.

The samples 400A, 400B, and 400C may be stored in a relational database system that logically organizes data into database tables. The database tables arrange data associated with flights into a series of columns 405, 410, 415, and 420 and rows 425a-425r. Each of rows 425a-425r represents a collection of attribute values for a particular flight identifiable by the flight identifier 405. More particularly, each of the rows 425a-425r represents the information included in a flight data structure 320 of FIG. 3. Each of the columns 405, 410, 415, and 420 describes an attribute of a flight for which data is being stored. More particularly, each of the columns 405, 410, 415, and 420 represents a field in the corresponding flight data structure 320. The attributes include a flight identifier 405 of a particular flight, a destination airport identifier 410 of the particular flight, a flight time 415 of the particular flight, and a passenger number 420 of the particular flight. The flight identifier 405, the destination airport identifier 410, the flight time 415, and the passenger number 420 correspond to the flight identifier 325, the destination airport identifier 330, the flight time 335, and the passenger number 340, respectively, of the flight data structure 320 corresponding to the particular flight.

For example, the samples 400A, 400B, and 400C include information specifying six flights in rows 425a, 425b, 425g, 425h, 425m, and 425n that are to depart at 7:00 AM, which are the first flights out of the corresponding airports. More particularly, the row 425a specifies a flight to be flown from Johannesburg to Cape Town with 100 people, the row 425b specifies a flight to be flown from Johannesburg to Durban with 50 people, the row 425g specifies a flight to be flown from Cape Town to Johannesburg with 150 people, the row 425h specifies a flight to be flown from Cape Town to Durban with 75 people, the row 425m specifies a flight to be flown from Durban to Johannesburg with 80 people, and the row 425n specifies a flight to be flown from Durban to Cape Town with 80 people.

Referring to FIG. 5, an example aircraft data structure 500 includes information describing an aircraft that is available to service one of the flights referred to by the airport data structure 300 of FIG. 3. Each aircraft agent, such as one of the aircraft agents 120a-120n of FIG. 1, includes or is associated with an aircraft data structure 500 that includes data describing the corresponding aircraft. The aircraft data structure 500 includes an aircraft identifier 505 that may be used to reference the aircraft data structure 500 and the aircraft described by the aircraft data structure 500. The aircraft data structure 500 also includes a capacity 510 that indicates that number of passengers that may be carried on the represented aircraft. An overhead cost 515 indicates the cost of servicing a flight with the represented aircraft, regardless of the number of passengers onboard. A passenger cost 520 indicates the incremental cost per passenger on a flight serviced by the represented aircraft. The aircraft data structure 500 also includes an optional usage amount 525 that indicates the number of hours the represented aircraft has flown since last being receiving service and an optional current airport identifier 530 that identifies the airport at which the aircraft is currently located.

FIG. 6 represents a sample 600 of aircraft information that describes the aircraft that are available to service the flights specified the samples 400A, 400B, and 400C from FIGS. 4A, 4B, and 4C, respectively. The sample 600 may be stored in a relational database system that logically organizes data into database tables. The database tables arrange data associated with flights into a series of columns 605, 610, 615, and 620 and rows 625a-625f. Each row 625a-625f represents a collection of attribute values for a particular aircraft identifiable by the aircraft identifier 605. More particularly, each of the rows 625a-625f represents the information included in an aircraft data structure 500 of FIG. 5. Each of the columns 605, 610, 615, and 620 describes an attribute of an aircraft for which data is being stored. The attributes include an aircraft identifier 605 of a particular aircraft, a capacity 610 of the particular aircraft, an overhead cost 615 of the particular aircraft, and a passenger cost 620 of the particular aircraft. The aircraft identifier 605, the capacity 610, the overhead cost 615, and the passenger cost 620 correspond to the aircraft identifier 505, the capacity 510, the overhead cost 515, and the passenger cost 520, respectively, of the aircraft data structure 500 corresponding to the particular aircraft.

For example, the sample 600 includes six aircraft that may service the flights specified in the samples 400A, 400B, and 400C, all of which have a passenger cost of 10. More particularly, the row 625a identifies an aircraft with a capacity of 200 and an overhead cost of 400. The rows 625b and 625c each identify an aircraft with a capacity of 150 and an overhead cost of 300. Similarly, the rows 625d and 625e each identify an aircraft with a capacity of 100 and an overhead cost of 100. Finally, the row 625f identifies an aircraft with a capacity of 50 and an overhead cost of 100.

FIG. 7 represents a portion of the schedule 700 that is created as a result of allowing aircraft agents corresponding to the aircraft specified in the sample 600 of FIG. 6 to submit bids for the flights specified in the samples 400A, 400B, and 400C, of FIGS. 4A, 4B, and 4C, respectively. More particularly, the schedule 700 may be created by assigning the aircraft to the flights based on the bids, such as by using the process 200. The schedule 700 may be stored in a relational database system that logically organizes data into database tables. The database tables arrange data associated with flights into a series of columns 705, 710, 715, and 720 and rows 725a-725j. Each of the columns 705, 710, 715, and 720 describes an attribute of a flight for which data is being stored in the schedule 700. Each row 725a-725j represents a collection of attribute values for a particular flight in the schedule 700. The attributes include a flight time 705 of a particular flight, an origin airport 710 of the particular flight, a destination airport 715 of the particular flight, and an aircraft identifier 720 of the particular flight.

The schedule 700 is created by an allocation manager agent, such as the allocation manager agent 110 of FIG. 1, through execution of the process 200 of FIG. 2A. All of the flights in the schedule 700 are between the airports at Johannesburg, Cape Town, and Durban. All of the aircraft are initially at the airport at Johannesburg. Therefore, if an aircraft is to service a flight that is departing from Cape Town or Durban, then the aircraft first has to be moved to that departing airport. For the purposes of this example, it is assumed that the aircraft all fly the same speed, and that the flying time between any two of the three airports is one hour.

To start, airport agents corresponding to the airports at Johannesburg, Cape Town, and Durban each submit the requested flights to the allocation manager agent responsible for creating the schedule 700, and the allocation manager agent receives the information (step 205). More particularly, the airport agent representing the Johannesburg airport submits the information included in the sample 400A to the allocation manager agent, the airport agent corresponding to the Cape Town airport submits the information included in the sample 400B to the allocation manager agent, and the airport agent corresponding to the Durban airport submits the information included in the sample 400C to the allocation manager agent. The allocation manger consolidates the requested flight information into a single location and makes the requested flight information available to aircraft agents corresponding to the aircraft specified in the sample 600 (step 210).

The aircraft agents inspect the requested flight information and submit bids to the flights that the corresponding aircraft have enough passenger capacity to service. For example, the aircraft specified in the row 625a of the sample 600 may submit a bid for the flight between Cape Town and Johannesburg specified in the row 425g of the sample 400B, because the aircraft has sufficient capacity to service the flight. However, the aircraft specified in the row 625d of the sample 600 may not service the flight specified in the row 425g of the sample 400A because the aircraft does not have enough capacity to service the flight. The value of a bid submitted by an aircraft agent for a flight is equal to the overhead cost 645 of the corresponding aircraft plus the passenger cost 620 of the corresponding aircraft multiplied by the number of passengers 420 on the flight.

The allocation manager agent receives the bids from the aircraft agents (step 215) and evaluates the bids (step 220). The manner in which the allocation manager agent evaluates the bids to create the part of the schedule 700 relating to the requested flights that depart at 7:00 AM or earlier is described below (steps 225-235). When evaluating the bids for a particular flight, the allocation manager agent identifies the bid from an aircraft agent that corresponds to an aircraft that would have the least amount of unused passenger capacity if the aircraft services the flight. The allocation manager agent assigns the flight to the aircraft corresponding to the identified bid and adds the flight to the schedule. The flights specified in the rows 725e and 725f of the schedule 700 have been added to the schedule 700 in this manner.

For example, the aircraft specified in the row 625d of FIG. 6 submitted a bid for the flight specified in the row 425a of FIG. 4A. The aircraft 625d has a capacity that matches the number of passengers on the flight 425a, so there is no unused aircraft capacity on the flight 425a. Consequently, the allocation manager agent assigns the aircraft 625d to the flight 425a, and the flight is added to the schedule 700 of FIG. 7 in the row 725e.

Similarly, the aircraft specified in the row 625f of FIG. 6 submitted a bid for the flight specified in the row 425b of FIG. 4A. The aircraft 625f has a capacity that matches the number of passengers on the flight 425b, so there is no unused aircraft capacity on the flight 425b. Consequently, the allocation manager agent assigns the aircraft 625f to the flight 425b, and the flight is added to the schedule 700 of FIG. 7 in the row 725f.

The remaining flights requested at 7:00 AM are scheduled to depart from the Cape Town and Durban airports, but all of the aircraft are at the Johannesburg airport at 7:00 AM. Therefore, aircraft must be moved between from Johannesburg to Cape Town and Durban prior to the requested 7:00 AM flights. Since all of the airports are one hour apart, four flights from Johannesburg at 6:00 AM are needed to enable service of the requested flights from Cape Town and Durban at 7:00 AM. More particularly, aircraft are needed to service the flights from Cape Town specified in the rows 425g and 425h of FIG. 4B and the flights from Durban specified in the rows 425m and 425n of FIG. 4C. Consequently, two flights from Johannesburg to Cape Town and two flights from Johannesburg to Durban at 6:00 AM are added to the set of flights to be serviced.

The allocation manager agent enables the aircraft agents to bid for those flights. Because the aircraft specified in the rows 625d and 625f of FIG. 6 have already been assigned to flights at 7:00 AM, the aircraft specified in the rows 625a, 625b, 625c, and 625e are the only aircraft available to service the additional flights at 6:00 AM and the related flights at 7:00 AM. Those aircraft submit bids for a flight at 6:00 AM based on whether the aircraft may service the related flight at 7:00 AM.

More particularly, the aircraft 625a submits a bid for and is assigned to the 6:00 AM flight from Johannesburg to Cape Town and the related flight from Durban specified in the row 425g because the aircraft 625a has sufficient capacity to service the flight 425g. The 6:00 AM flight and the related 7:00 AM flight are added to the schedule 700 in the rows 725a and 725g, respectively.

Similarly, the aircraft 625b submits a bid for and is assigned to the 6:00 AM flight from Johannesburg to Durban and the related flight from Durban specified in the row 425m because the aircraft 625b has sufficient capacity to service the flight 425m. The 6:00 AM flight and the related 7:00 AM flight are added to the schedule 700 in the rows 725b and 725h, respectively.

The aircraft 625c submits a bid for and is assigned to the 6:00 AM flight from Johannesburg to Cape Town and the related flight from Cape Town specified in the row 425h because the aircraft 625c has sufficient capacity to service the flight 425h. The 6:00 AM flight and the related 7:00 AM flight are added to the schedule 700 in the rows 725c and 725i, respectively.

Finally, the aircraft 625e submits a bid for and is assigned to the 6:00 AM flight from Johannesburg to Durban and the related flight from Durban specified in the row 425n because the aircraft 625d has sufficient capacity to service the flight 425n. The 6:00 AM flight and the related 7:00 AM flight are added to the schedule 700 in the rows 725d and 725j, respectively.

In substantially the same way, the flights specified in the samples 400A, 400B, and 400C that are to depart at 8:00 AM and 9:00 AM may be assigned to aircraft and added to the schedule 700 based on the bids received. Each flight may be serviced using an aircraft that is available at the airport from which the flight is to depart at the time at which the flight is to depart rather than moving the aircraft that can most efficiently service the flight to the airport prior to the flight. After the complete schedule has been created, the allocation manager agent may inform a resource manager, such as the resource manager agent 125 of FIG. 1, of the flights in the schedule such that the resource manager agent may determine if the number of available aircraft should be changed or if any of the aircraft require maintenance (step 240). The allocation manager also may pass the schedule to an operations manager agent, such as the operations manager agent 130 of FIG. 1, so that the operations manager agent may modify the schedule in response to changes in the availability of the aircraft that service the flights in the schedule (step 245).

A database table is used throughout to represent the manner in which information specifying the requested flights, the aircraft available to service the requested flights, and the assignments of available aircraft to requested flights are stored and accessed. However, other data storage technologies may be used. For example, the information may be stored as rows in a relational database table, objects in an object-oriented database, data in an extensible mark-up language (XML) file, or records in a data file.

A number of implementations have been described. Nevertheless, it will be understood that various modifications may be made. For example, the agents included in the airline scheduling system 100 of FIG. 1 may be distributed over multiple computer systems that are connected by one or more networks. The networks may be Wide Area Networks (WANs), Local Area Networks (LANs), analog or digital wired and wireless telephone networks (e.g. a Public Switched Telephone Network (PSTN)), an Integrated Services Digital Network (ISDN), or a Digital Subscriber Line (DSL)), or any other wired or wireless network. Accordingly, other implementations are within the scope of the following claims.

What is claimed is:

1. An article of manufacture for scheduling airline flights comprising computer readable instructions embodied on a tangible media and operable to:

identify airport information for each of a plurality of airports, the airport information including a geographic location, an airport identifier, flights departing from the airport including a flight identifier, an indication of a destination airport, an indication of a departure time, and a number of passengers for the flight;

identify previously scheduled flights between airports that are not assigned an aircraft;

identify aircraft information associated with a plurality of available aircrafts including an aircraft identifier, a passenger capacity, an overhead cost for each flight regardless of number of passengers on a flight flown by the aircraft, and a passenger cost for each passenger on a flight flown by the aircraft;

receive bids to service the flights that have not been assigned aircrafts;

assign the bids to generate an initial schedule of flights;

determine whether an overall cost of all flights in the initial schedule violates a predetermined cost parameter; and in response to at least the violation, re-assign aircrafts to the unassigned flights without changing the flights to generate a subsequent schedule different from the initial schedule.

2. The media of claim 1 wherein the predetermined cost parameter comprises an optimal cost of servicing all of the flights that is determined by running an optimization process across all of the tentatively scheduled flights.

3. The media of claim 2 wherein the optimization process comprises a genetic algorithm.

4. The media of claim 1 the instructions further operable to monitor maintenance requirements of the aircrafts and prevent submission of bids for aircraft that need maintenance.

5. The media of claim 1 the instructions further operable to reassign an aircraft to a flight in response to disruptions in the ability of an aircraft assigned originally to service the flight.

6. The media of claim 1 wherein each airport represents a simulated airport.

7. The media of claim 1 wherein each airport represents an actual airport.

8. The media of claim 1 wherein each aircraft represents a simulated aircraft.

9. The media of claim 1 wherein each aircraft represents an actual aircraft.

10. The media of claim 1 wherein the instructions model scheduling flights to be flown by simulated aircraft between simulated airports.

11. The media of claim 1 wherein the instructions schedule flights to be flown by actual aircraft between actual airports.

* * * * *